US008054888B2

(12) United States Patent
Seo (10) Patent No.: US 8,054,888 B2
(45) Date of Patent: Nov. 8, 2011

(54) APPARATUS AND METHOD FOR CONVERTING A CODEC OF IMAGE DATA

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1242 days.

(21) Appl. No.: 11/021,211

(22) Filed: Dec. 23, 2004

(65) Prior Publication Data

US 2005/0141621 A1    Jun. 30, 2005

(30) Foreign Application Priority Data

Dec. 24, 2003 (KR) .................. 10 2003 0096866

(51) Int. Cl.
*H04N 7/12* (2006.01)
(52) U.S. Cl. ......... 375/240.25; 375/240.26; 375/240.01; 375/240.02; 375/240.12; 375/240.13; 375/240.14; 375/240.15; 375/240.16; 375/240.17; 375/240.18; 375/240.19; 375/240.2
(58) Field of Classification Search .......... 375/240.25–240.26, 240.01–240.02, 375/240.12–240.2
See application file for complete search history.

(56) References Cited

U.S. PATENT DOCUMENTS

| 5,801,781 | A | 9/1998 | Hiroshima et al. ........... 348/441 |
| 7,016,547 | B1 * | 3/2006 | Smirnov ....................... 382/245 |

FOREIGN PATENT DOCUMENTS

| CN | 1358031 | 7/2002 |
| EP | 1 032 219 B1 | 5/2003 |
| JP | 2000-244910 | 9/2000 |
| JP | 2000-253403 | 9/2000 |
| JP | 2001-061142 | 3/2001 |
| JP | 2001-081142 | 3/2001 |
| JP | 2002-77913 | 3/2002 |
| JP | 2002-152755 | 5/2002 |
| JP | 2003-078856 | 3/2003 |
| WO | 99/22524 | 5/1999 |
| WO | 01/91467 | 11/2001 |

OTHER PUBLICATIONS

S. Dogan, A. H. Sadka and A. M. Kondoz, "Tandeming/Transcoding Issues Between MPEG-4 and H.263," Centre for Communication Systems Research (CCRS), University of Surrey, Guildford GU2 7XH, Surrey, UK, Mar. 1999.
S. Dogan et al., "Efficient MPEG-4/H.263 Video Transcoder for Interoperability of Heterogeneous Multimedia Networks," Electronics Letters, vol. 35, No. 11, May 1999, XP-006012181.
International Telecommunication Union (ITU), "Video Coding for Low Bit Rate Communication," ITU-T H.263 Series Recommendation: Audiovisual and Multimedia Systems—Infrastructure of Audiovisual Services—Coding of Moving Video, Feb. 1998, XP-017401441.
Video, "Text of ISO/IEC 14496-2:2001 (Unifying N2502, N3307, N3056, and N3664)," Information Technology—Coding of Audiovisual Objects—Part 2: Visual, Jul. 2001, XP-030011964.

* cited by examiner

*Primary Examiner* — Jay Patel
*Assistant Examiner* — Geepy Pe
(74) *Attorney, Agent, or Firm* — Lee, Hong, Degerman, Kang & Waimey

(57) ABSTRACT

A system and method for converting a codec of image data is provided. The system includes a syntax converter for selectively converting first image data having a first syntax into second image data having a second syntax in response to a comparison of the first image data and the second image data, and a decoder for decoding a bit stream outputted from the syntax converter.

10 Claims, 6 Drawing Sheets

| video_plane_with_short_header() { | No. of bits | Mnemonic |
|---|---|---|
| short_video_start_marker | 22 | bslbf |
| temporal_reference | 8 | uimsbf |
| marker_bit | 1 | bslbf |
| zero_bit | 1 | bslbf |
| split_screen_indicator | 1 | bslbf |
| document_camera_indicator | 1 | bslbf |
| full_picture_freeze_release | 1 | bslbf |
| source_format | 3 | bslbf |
| picture_coding_type | 1 | bslbf |
| four_reserved_zero_bits | 4 | bslbf |
| vop_quant | 5 | uimsbf |
| zero_bit | 1 | bslbf |
| do{ | | |
|    pei | 1 | bslbf |
|    if(pei="1") | | |
|      psuup | 8 | bslbf |
| }while(pei="1") | | |
| gob_number=0 | | |
| for(i=0;i<num_gobs_in_vop;i++) | | |
|    gob_layer() | | |
| if(next_bits()=short_video_end_maker) | | |
|    short_vedio_end_maker | 22 | uimsbf |
| while(!bytealigned()) | | |
|    zero_bit | 1 | bslbf |
| } | | |

FIG. 5
RELATED ART

| gob_layer(){ | No. of bits | Mnemonic |
|---|---|---|
| gob_header_empty=1 | | |
| if(gob_number !=0) { | | |
|     if(next_bits()=gob_resync_marker) { | | |
|         gob_header_empty=0 | | |
|         gob_resync_marker | 17 | bslbf |
|         gob_number | 5 | uimsbf |
|         gob_frame_id | 2 | bslbf |
|         quant_scale | 5 | uimsbf |
|     } | | |
| } | | |
| for(i=0; i<num_macroblocks_in_gob;i++) | | |
| macroblock() | | |
| if(next_bits() !=gob_resync_maker && nextbits_bytealigned()=gob_resync_maker) | | |
|     while(!bytealigned()) | | |
|         zero_bit | 1 | bslbf |
| gob_number++ | | |
| } | | |

APPARATUS AND METHOD FOR CONVERTING A CODEC OF IMAGE DATA

CROSS-REFERENCE TO RELATED APPLICATIONS

Pursuant to 35 U.S.C. §119(a), this application claims the benefit of earlier filing date and right of priority to Korean Application No. 10-2003-0096866, filed on Dec. 24, 2003, the contents of which are hereby incorporated by reference herein in its entirety.

BACKGROUND OF THE INVENTION

1. Field of the Invention

The present invention relates to an apparatus and method for converting a codec of image data and, more particularly, to an apparatus and method for converting a codec of image data using a decoder of a different video. codec.

2. Description of the Related Art

Video codecs are widely used by movie producers and internet providers. A standard video codec utilized by an image service provider for a wired/wireless network is H.263 and an MPEG (Moving Picture Experts Group)-4.

H.263 is a requisite video codec for terminals. Other standards include H.320 integrated services digital network (ISDN), H.323 internet image terminal standard (IITS), H.324 public switched telephone network (PSTN), or the like. Others, such as European mobile communication providers, provide image services such as video on demand (VOD) using H.263.

MPEG-4 is a video standard based on core techniques of H.263. MPEG-4 compresses and/or restores data to transmit video at a low transfer rate for multimedia communication.

The image data of H.263 has a layer structure made up of a picture layer, a group of blocks (GOB) layer, a macroblock layer, and a block layer.

Figure 1:
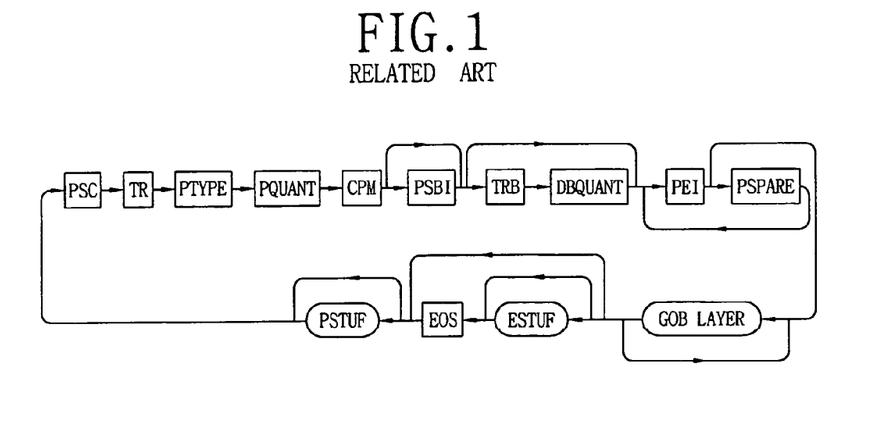
FIG. 1 is a flow diagram illustrating syntax information in a picture layer of an H.263 syntax.
Figure 2:
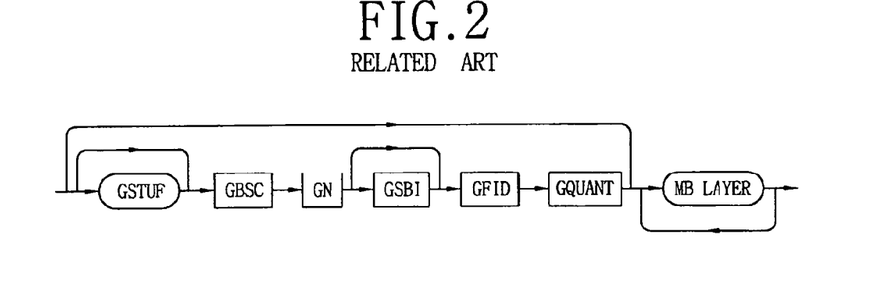
FIG. 2 is a flow diagram illustrating syntax information in a group of blocks (GOB) of the H.263 syntax.

Referring to FIG. 1, the syntax information of a conventional profile is shown for a picture layer of an image file. The image file has multiple fields. Each of the multiple fields provides directions for moving image data from one location to another location. Referring to FIG. 2, the syntax of the conventional GOB layer illustrating the connections between each of the multiple fields. The GOB layer, like the picture layer, defines locations for moving image data. Both FIGS. 1 and 2 illustrate base line profiles for functionality in the H.263.

Figure 3:
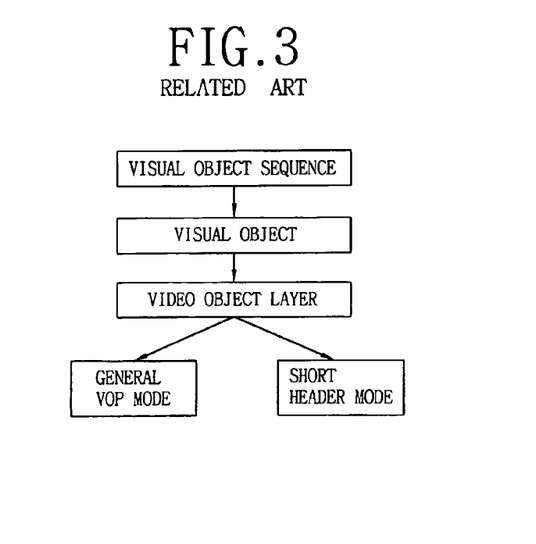
FIG. 3 is a block diagram showing a short header mode paged from a header of a bit stream and generated as a bit stream.

Referring to FIG. 3, a visual object sequence and a visual object header are generated of a conventional MPEG-4 bit stream. A visual object layer pages a general video object plane (VOP) mode or a short header mode. When the short header mode is paged from the video object layer, a short header mode syntax is created.

Figure 4:
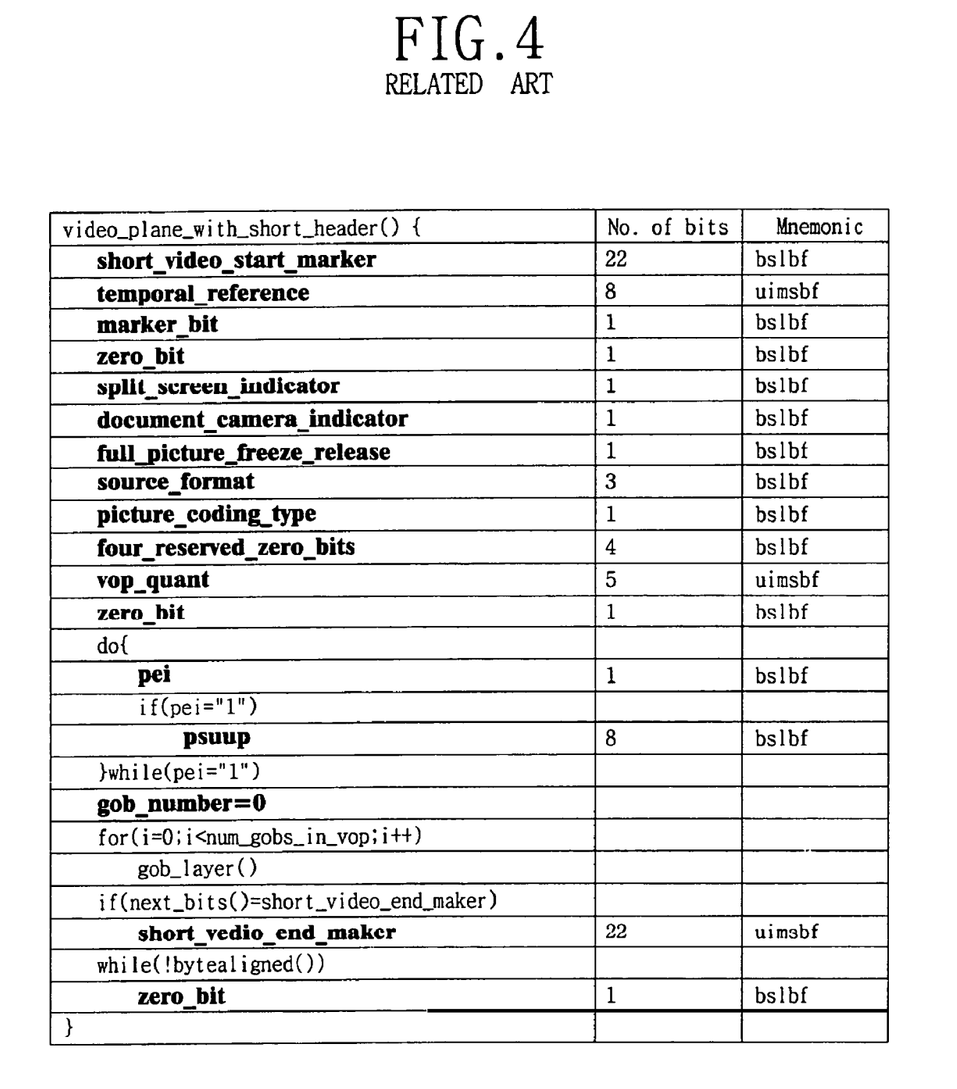
FIG. 4 is a table illustrating the short header mode syntax of the MPEG-4.
Figure 5:
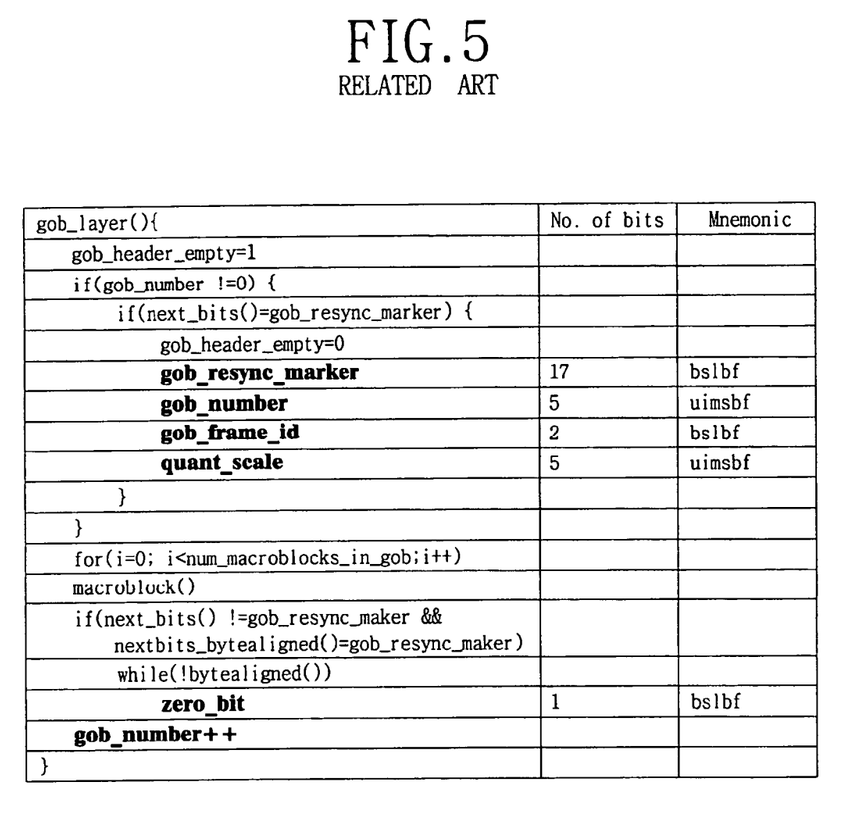
FIG. 5 is table illustrating a syntax of the GOB layer of FIG. 4.

Referring to FIG. 4, a comparison is performed between the short header mode syntax of the MPEG-4 and the syntax of the H.263 baseline profile. The MPEG-4 bit stream is similar to the H.263 bit stream in its performance and structure. Because the header part and/or the syntax of MPEG-4 bit stream are not identical to that of the H.263 bit stream, formatting compatibility issues exist between MPEG-4 and an H.263 decoder. To maintain processing compatibility converting image data between the MPEG-4 and H.263 standards, codecs of each of the standards are required at the mobile terminal. This compatibility problem results in undesirably increasing fabrication costs and volume of a mobile terminal.

Therefore, there is a need for a system that overcomes the above problems and provides advantages over other image data processing systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a system comprises a syntax converter for selectively converting first image data having a first syntax into second image data having a second syntax in response to a comparison of the first image data with the second image data, and a decoder for decoding a bit stream outputted from the syntax converter. The syntax converter generates required syntax information for converting the first image data having the first syntax to the second image data. The syntax converter generates syntax information not present in the first syntax for converting the first image data to the second image data.

The syntax converter discards syntax information of the first syntax. The syntax converter maps syntax information present in the first image data to a corresponding location in the second image data. The syntax converter maps data fields directly from the first image data to the second image data upon detecting that a bit length and a bit value of the data fields of both the first syntax and the second syntax are identical.

In another embodiment, a method for converting a codec of image data comprises converting selectively first image data having a first syntax into second image data having a second syntax in response to a comparison of the first image data and the second image data, producing a bit stream output, and decoding the bit stream output. Further, required syntax information for converting the first image data to the second syntax is generated in response to a comparison of the first image data and the second image data. The method further comprises generating required syntax information for converting the first image data to the second image data not present in the first syntax for converting to the second syntax.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein.

DETAILED DESCRIPTION OF THE PREFERRED EMBODIMENTS

The present invention relates to a system and method for converting data from one format to another. The invention relates to a system and method for converting a codec of image data comprising a syntax converter for converting first image data having a first syntax into second image data having a second syntax. A decoder is provided for decoding the image data converted into the second syntax.

The invention provides an apparatus and method for converting a codec of image data capable of directly reproducing a bit stream generated by an MPEG-4 short header mode by using a H.263 decoder.

The present invention provides a systematic approach for converting between the MPEG-4 and the H.263 standards so that image data coded in the MPEG-4 short header mode can be decoded in a terminal having a H.263 decoder.

The present invention provides a terminal that can process image data of both MPEG-4 and the H.263 standards having a low fabrication cost, less complexity, and reduced volume.

Although the invention is illustrated with respect to a MPEG-4 syntax and H.263 syntax, it is contemplated that the invention may be utilized anywhere it is desired for transmitting, receiving, or processing audio and/or video signals. Reference will now be made in detail to the preferred embodiments of the present invention, examples of which are illustrated in the accompanying drawings.

Figure 6:
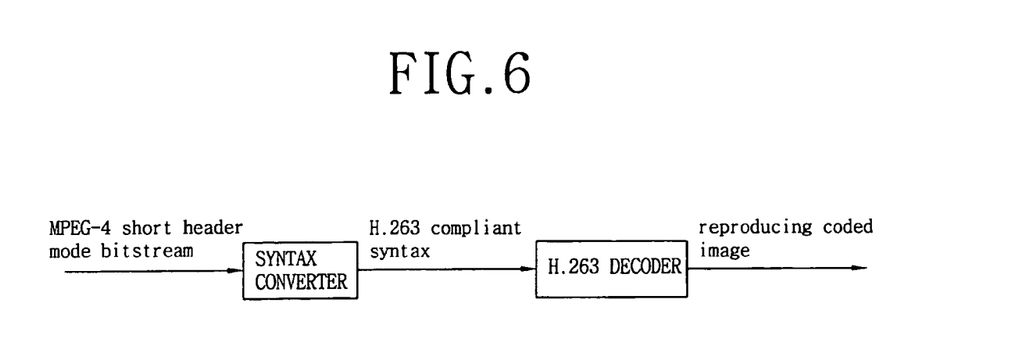
FIG. 6 is a block diagram illustrating a system for converting a codec of image data in accordance with a preferred embodiment of the present invention.

Referring to FIG. 6, a system for converting a codec of image data comprises a syntax converter. The syntax converter compares syntax information of a MPEG-4 short header mode with H.263 syntax information and converts MPEG-4 syntax information into H.263 syntax information. A decoder is provided for decoding a bit stream outputted from the syntax converter. In this case, the decoding unit is H.263 decoder.

To obtain a syntax that can be decoded in the H.263 decoder, the syntax converter maps the syntax information of the MPEG-4 short header mode to the H.263 syntax information, generates required syntax information, and discards unnecessary syntax information.

Figure 7:
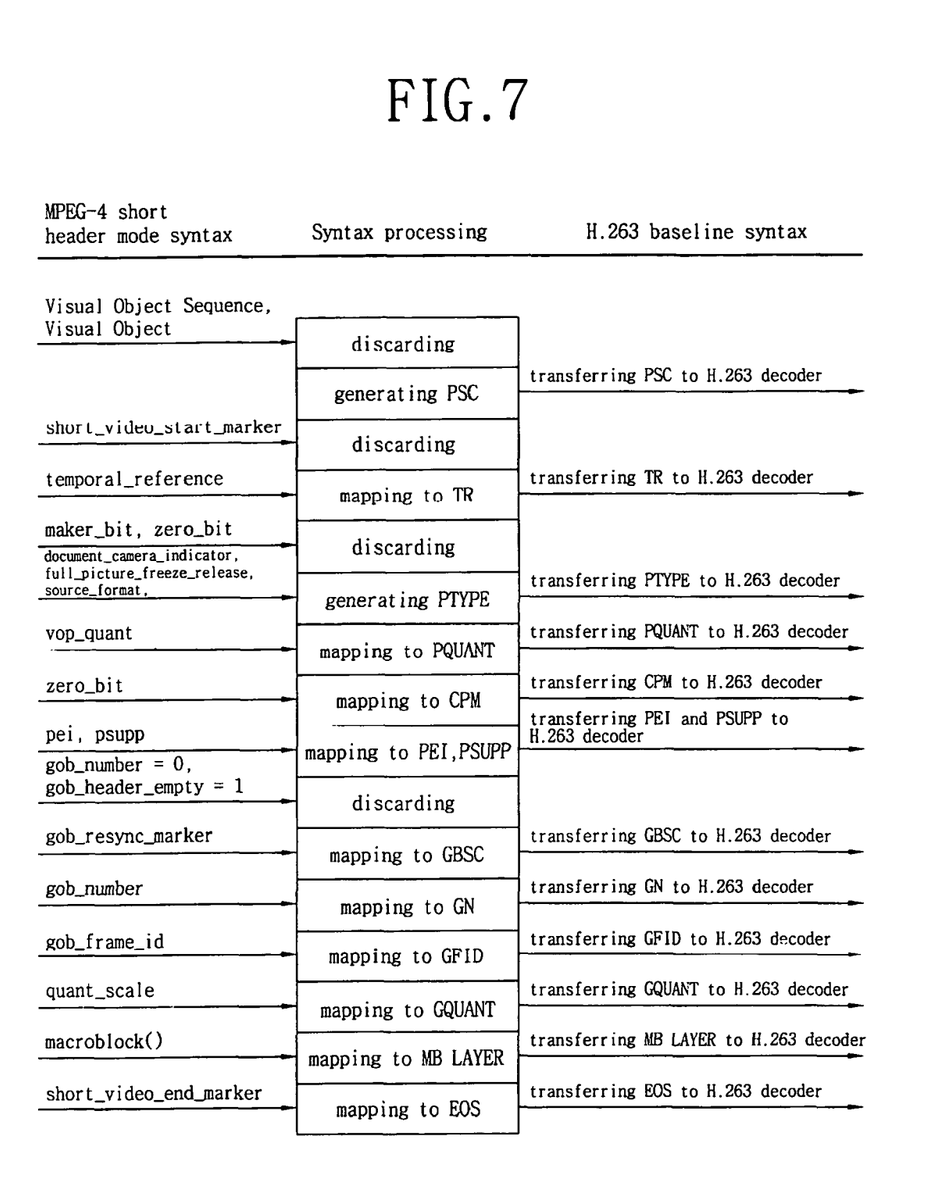
FIG. 7 is a block diagram of a syntax converter in accordance with the preferred embodiment of the present invention.

Referring to FIG. 7, image data having a MPEG-4 short header mode is input to a syntax converter. The syntax converter compares a MPEG-4 short header mode syntax to that of a H.263 syntax.

In one embodiment, if the syntax of the MPEG-4 short header mode is identical to that of the H.263 syntax, the corresponding information is directly mapped to that of the H.263 syntax. For example, the syntax information of an MPEG-4 short header mode field temporal_reference is mapped to fields TR,split_screen_indicator,document_camera_indicator,full_picture_freeze_release,source_format, picture_coding_type of the H.263 syntax. The syntax information of an MPEG-4 short header mode field four_reserved_zero_bits is mapped to field PTYPE of the H.263 syntax. The syntax information of MPEG-4 short header mode field vop_quant is mapped to field PQOANT of the H.263 syntax. The syntax information of MPEG-4 short header mode field zero_bit is mapped to field CPM of the H.263 syntax. The syntax information of MPEG-4 short header mode fields pei and psupp are mapped to fields PEI and PSUPP of the H.263 syntax. The syntax information of MPEG-4 short header mode fields short_video_end_marker is mapped to field EOS of the H.263 syntax.

The MPEG-4 GOB layer syntax information field gob_resync_marker is mapped to field GBSC of the H.263 syntax. The MPEG-4 syntax information field gob_number is mapped to GN of the H.263 syntax. The MPEG-4 syntax information field gob_frame_id is mapped to field GFID of the H.263 syntax. The MPEG-4 syntax information field quant_scale is mapped to field GQIANT of the H.263 syntax. The MPEG-4 syntax information field macroblock( ) is mapped to field MPLAYER of the H.263 syntax.

In one embodiment, a bit length and bit value between the mapped syntaxes are the same, but the H.263 syntax corresponding to field PTYPE and the MPEG-4 syntax corresponding to field PTYPE are different bit lengths. In one example, the H.263 syntax corresponding to a field PTYPE is 13 bits and the MPEG-4 syntax corresponding to a field PTYPE is 11 bits. Upon the syntax converter performing a mapping, the first 2 bits of the H.263 syntax are set to, for example, 01 and the 11-bit MPEG-4 syntax is directly mapped to the remaining 11 bits of the H.263 syntax.

In another embodiment, the MPEG-4 short header mode syntax is inputted to the syntax converter performing a comparison with the H.263 syntax and searching for missing syntax information. For example, the H.263 syntax required for converting the syntax of the MPEG-4 short header mode, but not included in the MPEG-4 short header mode syntax, is generated.

In one example, the PSC of the H.263 syntax is not included in the MPEG-4 syntax. In this example, the syntax converter generates and transmits the PSC to the H.263 decoder. The PSC is 22-bit code required for H.263 is 0000 0000 0000 1000 00.

In yet another exemplary embodiment, the syntax of the MPEG-4 short header mode is inputted into the syntax converter for comparison with that of the H.263 syntax. The MPEG-4 syntax information not necessary for conversion to the H.263 syntax is discarded. The syntax information of the MPEG-4 header, for example, associated with fields the visual object, the short_video_start_marker, the marker_bit, and the zero_bit is discarded. In another example, the syntax information associated with the MPEG-4 GOB layer fields 'gob_number=0' and 'gob_header_empty=1' are also discarded.

Figure 8:
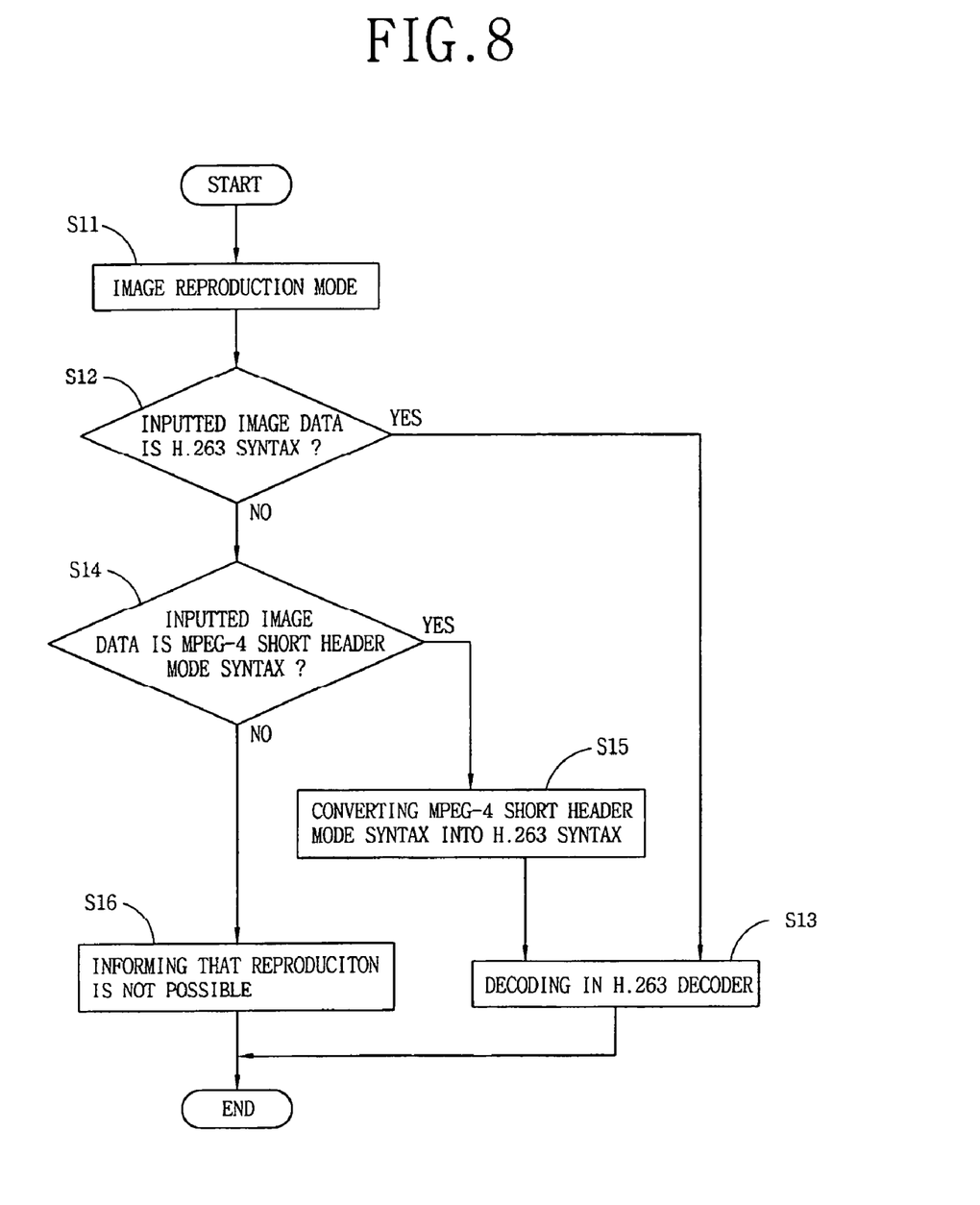
FIG. 8 is a flow chart showing a method for converting a codec of image data in accordance with a preferred embodiment of the present invention.

Referring to FIG. 8, a mobile terminal is placed in an image reproduction mode (S11). The standard of an inputted image data is H.263 syntax (S12). The inputted image data is processed by the syntax converter and outputted to the H.263 decoder for decoding (S13).

If the inputted image data is not H.263 syntax, a determination is made if the syntax is an MPEG-4 header mode (S14). If the image data is not the MPEG-4 header mode, the image data is not processed by the terminal. A user of the mobile terminal is informed that the inputted image data cannot be reproduced (S16).

If the inputted image data is the MPEG-4 header mode, a comparison between the MPEG-4 syntax is performed with the H.263 syntax. The MPEG-4 syntax is converted to the H.263 syntax (S15).

The process by which the MPEG-4 syntax is converted into the H.263 syntax is provided below. The visual object sequence and the visual object in the MPEG-4 header are discarded. A PCS code of, for example, 0000 0000 0000 0000 1000 00, required for the H.263 syntax, but not existing in the MPEG-4 syntax, is generated and transmitted to the H.263 decoder.

The MPEG-4 syntax information comprising the temporal_reference is mapped to the TR and transmitted to the H.263 decoder. The fields marker_bit and the zero_bit are discarded from the MPEG-4 syntax. The MPEG-4 syntax information fields split screen_indicator (1 bit), document_camera_indicator (1 bit), full_picture_freeze_release (1 bit), source_format (3 bits), picture_coding_type (1 bit) and four_reserved_zero_bits (4 bits) are mapped to the H.263 syntax into the PTYPE.

In this example, the MPEG-4 syntax information fields of 13 bit of PTYPE is mapped to PTYPE is 11 bits of the H.263 syntax. During the mapping process from MPEG-4 to H.263, the first 2 bits of the H.263 are set as 10 and the 11-bits of the MPEG-4 syntax are mapped to the H.263 syntax. The MPEG-4 syntax information field vop_quant is mapped to field PQUANT, the H.263 syntax, and field aero_bit is mapped to field CPM, and fields pei and psup are mapped to fields PEI and PSUPP without a change in values, and then transmitted to the H.263 decoder.

The MPEG-4 syntax information fields 'gob_number=0' and 'gob header empty=1' are discarded. The first GOB is automatically set without a header, so the GOB header is discarded. The MPEG-4 syntax information field gob_resync_marker is mapped to field GBSC of the H.263 syntax. The MPEG-4 syntax information fields gob_number and gob_frame_id are mapped to fields GN and the GFID of the H.263 syntax. The MPEG-4 syntax information field quant scale is mapped to field GQUANT of the H.263 syntax and transmitted to the H.263 decoder.

The MPEG-4 syntax information, decoding of the macroblock performed in the macroblock( ) is the same as the process performed in the MB LAYER of the H.263 syntax, so the syntax inside the macroblock( ) is mapped as it is to the MB LAYER and then transmitted to the H.263 decoder. The field short_video_end_marker of the MPEG-4 syntax information is mapped to field EOS of the H.263 syntax and then transmitted to the H.263 decoder. The H.263 syntax converted image data is inputted to the H.263 decoder for decoding (S13).

The following is an example including a mobile communication device using the method of the present invention.

Figure 9:
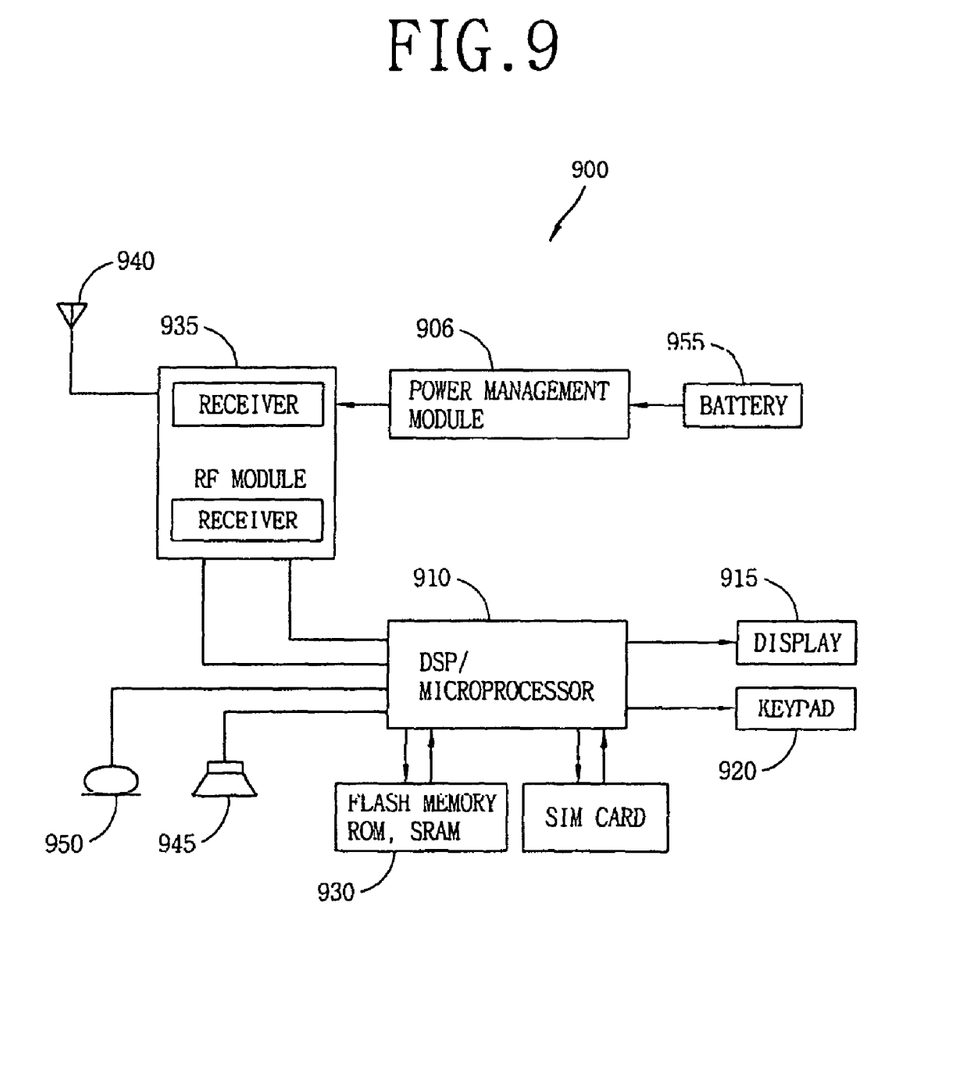
FIG. 9 is a block diagram illustrating a mobile communication device using the methods of the present invention.

Referring to FIG. 9, the mobile communication device 900 comprises a processing unit 910 such as a microprocessor or digital signal processor, an RF module 935, a power management module 906, an antenna 940, a battery 955, a display 915, a keypad 920, a storage unit 930 such as flash memory, ROM or SRAM, a speaker 945 and a microphone 950.

A user enters instructional information, for example, by pushing the buttons of a keypad 920 or by voice activation using the microphone 950. The processing unit 910 receives and processes the instructional information to perform the appropriate function. Operational data may be retrieved from the storage unit 930 to perform the function. Furthermore, the processing unit 910 may display the instructional and operational information on the display 915 for the user's reference and convenience.

The processing unit 910 issues instructional information to the RF module 935, to initiate communication, for example, transmit radio signals comprising voice communication data. The RF module 935 comprises a receiver and a transmitter to receive and transmit radio signals. The antenna 940 facilitates the transmission and reception of radio signals. Upon receive radio signals, the RF module 935 may forward and convert the signals to baseband frequency for processing by the processing unit 910. The processed signals would be transformed into audible or readable information outputted via the speaker 945.

The processing unit 910 performs the methods and provides the systems as illustrated in FIGS. 6-8. As an example, the processing unit 910 provides syntax converting means for selectively converting first image data having a first syntax into second image data having a second syntax in response to a comparison of the first image data having the first syntax and the second syntax, and decoding means for decoding a bit stream outputted from the syntax converting means.

Other features, as described above in FIG. 6-8, may be incorporated as well into the processing unit 910.

The processing unit 910 stores the messages received from and messages transmitted to other users in the storage unit 930, receives a conditional request for message input by the user, and processes the conditional request to read data corresponding to the conditional request from the storage unit. The processing unit 910 outputs the message data to the display unit 915. The storage unit 930 is adapted to store message data of the messages both received and transmitted.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail herein above.

What is claimed is:

1. A system for converting a codec of image data, the system comprising:
    a syntax converter for converting Moving Picture Experts Group 4 (MPEG-4) syntax information of first image data to H.263 syntax information of second image data, wherein the syntax converter is configured to:
        compare first MPEG-4 syntax information to syntax information of an H.263 standard to determine matched MPEG-4 syntax information,
        discard the first MPEG-4 syntax information when the first MPEG-4 syntax information is not required in the H.263 standard,
        receive a value of the first MPEG-4 syntax information or a value of the H.263 syntax information from a user of a mobile terminal,
        generate second syntax information not included in the first MPEG-4 syntax information and which is required in the H.263 standard, and
        map the matched MPEG-4 syntax information and the second syntax information to the H.263 syntax information,
        wherein the H.263 syntax information comprises a field PTYPE having 13 bits, such that a first two bits of the 13 bits are set to '10' and a last 11 bits of the 13 bits are mapped directly from a field PTYPE of the first MPEG-4 syntax information; and
    an H.263 decoder for decoding the H.263 syntax information to output image data in an H.263 format.

2. The system of claim 1, wherein the syntax converter is further configured to convert a first field of the first image data by adding data bits upon conversion to the H.263 syntax information when it is detected that the first field is shorter than a corresponding second field of the second image data.

3. The system of claim 1, further comprising an image data standard determiner for receiving an input header from image data input to the image data standard determiner and identifying a type of the image data by comparing the image data to at least the MPEG-4 syntax information or the H.263 syntax information.

4. The system of claim 1, wherein the H.263 decoder switches between decoding processes in response to detecting a bit stream output from the syntax converter.

5. The system of claim 1, wherein the H.263 decoder adapts to decoding a bit stream output from the syntax converter based on a user input to a mobile terminal.

6. A method for converting a codec of image data in a communication system, the method comprising:
    comparing first MPEG-4 syntax information to syntax information of an H.263 standard to determine matched MPEG-4 syntax information,
    selectively converting first image data comprising the first MPEG-4 syntax information into second image data comprising H.263 syntax information, wherein converting the first image data comprises:
        discarding the first MPEG-4 syntax information when the first MPEG-4 syntax information is not required in the H.263 standard,
        receiving a value of the first MPEG-4 syntax information or a value of the H.263 syntax information from a user of a mobile terminal,
        generating second syntax information not included in the first MPEG-4 syntax information and which is required in the H.263 standard, and
        mapping the matched MPEG-4 syntax information and the second syntax information to the H.263 syntax information,
        wherein the H.263 syntax information comprises a field PTYPE having 13 bits, such that a first two bits of the 13 bits are set to '10' and a last 11 bits of the 13 bits are mapped directly from a field PTYPE of the first MPEG-4 syntax information; and
    decoding the H.263 syntax information to output image data in an H.263 format.

7. The method of claim 6, wherein mapping the matched MPEG-4 syntax information comprises mapping the matched MPEG-4 syntax information directly from the first image data to the second image data upon detecting that a first bit length and a first bit value of a first data field of the matched MPEG-4 syntax information is identical to a second bit length and a second bit value of a second field of the H.263 syntax information.

8. The method of claim 6, wherein mapping the matched MPEG-4 syntax information comprises mapping the matched MPEG-4 syntax information of the first image data by adding data bits upon conversion to the second image data when it is detected that a first data field of the first image data is shorter than a corresponding second data field of the second image data.

9. The method of claim 6, further comprising:
    determining an image data standard for receiving an input header from the image data; and
    identifying a type of the image data based on a comparison between the first image data and the second image data.

10. The method of claim 6, further comprising switching between decoding processes in response to a detection of a bit stream output from a syntax converter.

* * * * *